July 28, 1970

H. V. TALBOT 3,521,776

DEVICE FOR LOADING AND UNLOADING SLIDE-IN TYPE
CAMPERS AND THE LIKE

Filed March 10, 1967

HAZEN VERE TALBOT
INVENTOR
BY
Edward Hoopes III

HIS ATTORNEY

July 28, 1970  H. V. TALBOT  3,521,776
DEVICE FOR LOADING AND UNLOADING SLIDE-IN TYPE
CAMPERS AND THE LIKE
Filed March 10, 1967  2 Sheets-Sheet 2

HAZEN VERE TALBOT
INVENTOR
BY
Edward Hooper III
HIS ATTORNEY

United States Patent Office 3,521,776
Patented July 28, 1970

3,521,776
DEVICE FOR LOADING AND UNLOADING SLIDE-IN TYPE CAMPERS AND THE LIKE
Hazen Vere Talbot, 301 S. 98th St., Mesa, Ariz. 85201
Filed Mar. 10, 1967, Ser. No. 622,167
Int. Cl. B60p *1/32, 3/38*
U.S. Cl. 214—516                              10 Claims

ABSTRACT OF THE DISCLOSURE

A vehicle such as a pickup truck having a generally horizontal bed, a rotatable toothed element such as a sprocket having a shoulder on each side of the teeth and centrally mounted on the vehicle at an edge of the bed, means for rotating such element and moving an object such as a camper adapted to be loaded onto the bed from a position with an undersurface thereof generally horizontal at a level below that of the bed, the object having a rack whose width is sufficient to engage each sprocket shoulder and which is inclined to the horizontal when the object is in said position, said element meshing with the rack so that upon rotation of said element it will traverse the rack and the vehicle and the object will be drawn together and the object will be moved relatively to the vehicle toward a position atop the bed. The inclined rack may be on a bracket swingable between horizontal operative position and transverse inoperative position. The inclined rack merges with a similar longitudinal rack on the bottom of the object. One form of supporting leg may be applied to the side of the object with a projection underlying the object to which the load is carried through the bottom of the object; the leg may be removed and turned through 90° and reapplied to the side of the object when not in use. Another form of supporting leg has a roller at its lower end and is carried by a bumper at the rear of the object, which in this case is a camper, and may be swung up in a transverse plane to inoperative position when not in use.

---

This invention relates to a device for loading and unloading slide-in type campers or other objects and to improved demountable or retractable supporting legs for campers and other objects which may rest upon the ground or be loaded onto a carrying vehicle.

Campers which may rest upon the ground and also be carried by a vehicle such as a pickup truck are well known. When such a camper is resting on the ground it may be supported by legs at an elevation above the ground but lower than the elevation above the ground of the bed of the truck which carries the camper from place to place. Consequently in loading the camper onto the truck it must be raised and moved laterally. Such a camper, known as a slide-in type camper, is heavy and bulky. Various proposals have heretofore been made for loading and unloading such campers but such proposals have not satisfactorily solved the problem; they have involved the use of intricate or costly mechanism or have been inefficient, involving means difficult to operate.

I have solved the problem by providing means for loading and unloading slide-in type campers with optimum facility without employing intricate or costly mechanism. For purposes of explanation and illustration I shall describe the invention in connection with the loading and unloading of a slide-in type camper onto and off of a pickup truck acting as a carrying vehicle although the invention in its broader aspects is applicable to the loading and unloading of various objects onto and off of vehicles of various types.

I provide a vehicle having a generally horizontal bed, a rotatable toothed element mounted on the vehicle at an edge of the bed, means for rotating said element and an object adapted to be loaded onto the bed from a position with an undersurface thereof generally horizontal at a level below that of the bed, the object having a central rack inclined to the horizontal when the object is in said position, said element meshing with the rack so that upon rotation of said element said element will traverse the rack and the vehicle and the object will be drawn together and the object will be moved relatively to the vehicle toward a position atop the bed. The object, which may be considered as being a camper, preferably has a rack on its undersurface in alignment with the inclined rack and in effect forming a continuation thereof so that the rotatable toothed element mounted on the vehicle after traversing the inclined rack will traverse the rack on the undersurface of the object whereby the object will be moved further relatively to the vehicle toward a position atop the bed. The toothed element has a shoulder on each side of the teeth and each rack has sufficient width to engage this shoulder at each side of the teeth, to reduce friction by the rolling action of the respective rack on the shoulders, to limit the penetration of the teeth into the rack and avoid jamming and to stabilize the object during loading and unloading.

In a preferred structure the object has a bracket projecting therefrom toward the vehicle, the bracket having its undersurface inclined to the horizontal when the object is in position with an undersurface thereof generally horizontal at a level below that of the bed, the inclined rack being disposed at said undersurface of the bracket. The bracket is desirably removable from its position projecting from the object as specified after the rotatable toothed element mounted on the vehicle has traversed the inclined rack so as not to interfere with movement of the object to its ultimate position atop the bed. The bracket may be pivotally mounted on the object so as to be swingable through an angle of about 90° to lie against the leading edge of the object as the object moves relatively to the vehicle toward a position atop the bed. I prefer to locate the racks substantially at the central vertical plane of the object in the direction of its movement relatively to the vehicle.

I further provide an object having a supporting leg applied to a generally vertical side portion of the object and while so applied being generally vertically movable relatively to the object, the leg having a projection adapted to underlie the object so that the downward thrust of the object is transmitted through the portion of the object overlying the projection minimizing stress on the generally vertical side portion of the object. A stud may project generally horizontally from the generally vertical side portion of the object and pass through an opening in the leg whose vertical dimension is substantially greater than that of the stud with means preventing removal of the stud from the opening.

I still further provide a camper having a rear bumper with a supporting leg pivoted to the bumper and swingable about its pivotal connection with the bumper transversely of the camper between an operative position extending downwardly from the pivotal connection and an inoperative position extending generally horizontally from the pivotal connection and means for maintaining the leg in each of said positions. The last mentioned means may include a latching pin carried by the leg and two openings in the bumper receiving the latching pin respectively when the leg is in operative position and when the leg is in inoperative position. Each rear leg is preferably provided with a roller at its lower end, so that the camper may roll toward and away from the vehicle during loading and unloading, respectively, rather than the vehicle being moved toward or away from the camper.

Other details, objects and advantages of the invention will become apparent as the following description of certain present preferred embodiments thereof proceeds.

In the accompanying drawings I have shown certain present preferred embodiments of the invention in which FIG. 1 is a diagrammatic side elevational view of a pickup truck showing a camper (a) in chain lines on the ground ready to be loaded onto the truck, (b) in broken lines partly loaded onto the truck and (c) in solid lines fully loaded onto the truck;

Figure 1:
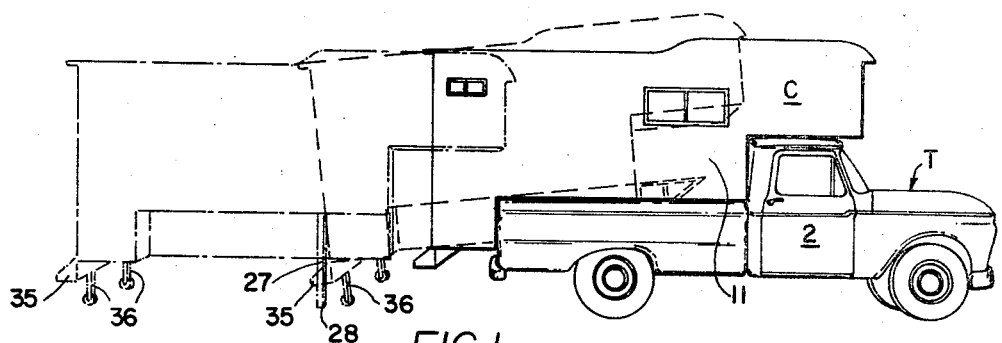
Figure 2:
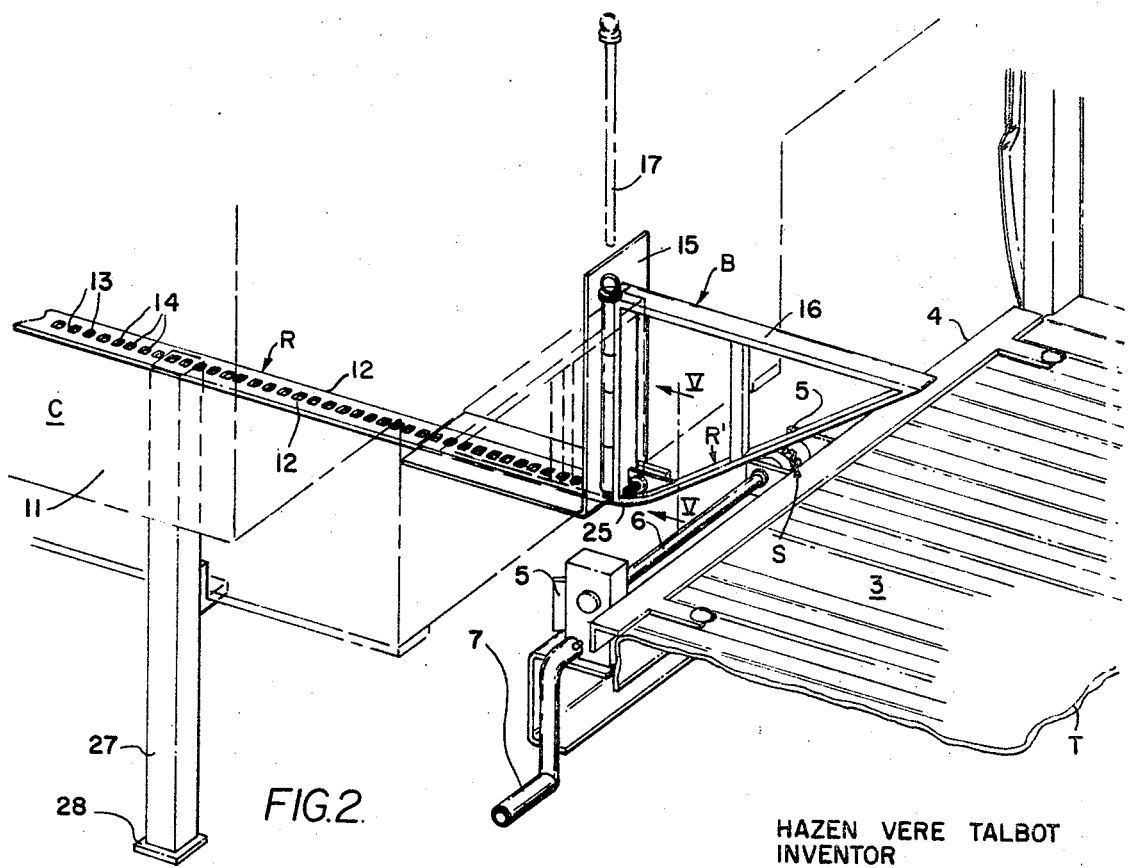
FIG. 2 is a fragmentary isometric view of portions of the truck and camper showing the means for loading and unloading the camper onto and off of the truck.

Referring now more particularly to the drawings and first to FIGS. 1 and 2, there is shown a pickup truck T having a cab 2 and a bed 3 to the rear end of which is attached a supporting structure 4 carrying bearings 5 in which is journaled a shaft 6 extending transversely of the truck at approximately the level of the surface of the bed 3 and adapted to be turned by a crank 7. Fixed to the shaft 6 at the longitudinal center line of the truck bed 3 is a sprocket S having a shoulder 8 at each side of sprocket teeth 9. As the shaft 6 turns the sprocket teeth 9 move to an uppermost position in which they project a short distance above the level of the surface of the truck bed.

There is also shown a camper C, which may be of conventional shape with a body 11 adapted when the camper is loaded onto the truck T to rest or seat on the truck bed 3. The camper in the form shown has an upper forwardly projecting portion overlying the cab of the truck when the camper is loaded onto the truck. In FIG. 1 the camper is shown in chain lines on the ground ready to be loaded onto the truck, in broken lines partly loaded onto the truck and in solid lines fully loaded onto the truck. When the camper is fully loaded onto the truck the front end of the body 11 of the camper is disposed at the extreme front portion of the truck bed immediately behind the cab 2 of the truck.

A rack R (FIG. 2) is applied to the bottom of the camper body 11 and extends longitudinally of the camper at its center line. The rack in the form shown has imperforate portions 12 on each side of teeth 13 formed by perforating the rack by equally spaced uniformly shaped openings 14. In short the rack is a perforated strip of steel. The openings 14 are of such size, shape and spacing that the teeth 9 of the sprocket S will mesh therewith, while the portions 12 engage the shoulders 8 of the sprocket S.

Figure 3:
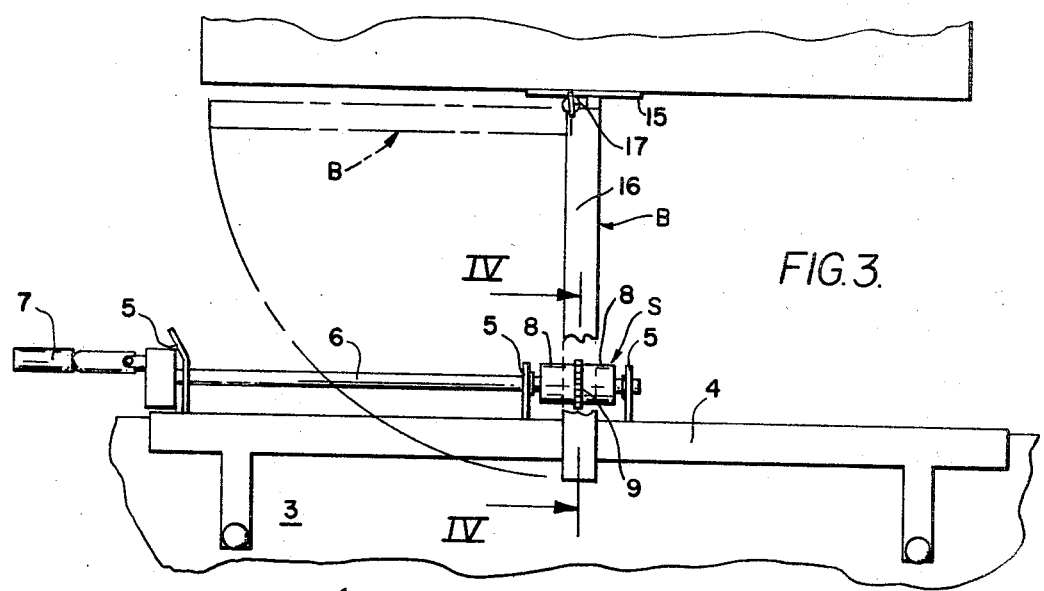
FIG. 3 is a fragmentary plan view of the loading and unloading means shown in FIG. 1.

Mounted on the front end of the camper body 11 is a plate 15 hingedly carrying a bracket B having a top bar 16. The hinge pin 17 is shown withdrawn in broken lines in FIG. 2. When the hinge pin is in place in the hinge knuckles of the plate 15 and the bracket B the bracket is hinged to the front of the body of the camper for horizontal swinging movement between operative position in longitudinal alignment with the center line or central longitudinal vertical plane of the camper as shown in solid lines in FIGS. 2 and 3 and inoperative position swung 90° from its operative position and lying against the front of the camper body as shown in broken lines in FIGS. 2 and 3. The hinge pin or pintle 17 is at a vertical corner of the bracket B as shown in FIGS. 2 and 3 so that the bracket may swing 90° to the left, viewing FIG. 3, from its operative position to its inoperative position but when swung back to its operative position will be stopped in longitudinal alignment with the center line of the camper by engagement of the rear face of the bracket with the front of the camper body. The bracket is latched in operative position by a latching pin 18 (FIG. 5) mounted on an ear 19 of the bracket and urged to the right, viewing FIG. 5, by a compression coil spring 20. When the bracket is in operative position and the latching pin 18 is projected by the spring 20 the end of the latching pin enters a bore 21 in a plate 22 mounted in fixed position on the camper body. To unlatch the bracket B to swing it from operative to inoperative position the latching pin is withdrawn to the left, viewing FIG. 5, by pulling on the ring 23 which forms the head of the latching pin until the end of the latching pin is withdrawn from the bore 21. When the bracket is swung back to operative position the end of the latching pin may automatically enter the bore 21 latching the bracket in operative position.

Figure 5:
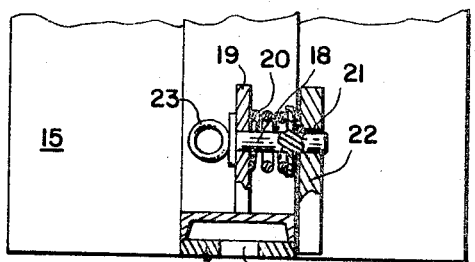
FIG. 5 is an enlarged fragmentary vertical transverse cross-sectional view taken on the line V—V of FIG. 2.

The bracket B has its undersurface inclined to the horizontal at an acute angle as shown in FIG. 2 and provided with perforations or recesses 24 and imperforate portions on each side thereof, as on rack R and as shown in FIG. 5, forming an inclined rack R' whose operative dimensions are the same as those of the rack R so that the sprocket S will mesh with the rack R' as well as with the rack R. The rack R' forms a forwardly and upwardly inclined extension of the rack R when the bracket B is in operative position. Bracket B may be reinforced by a strut extending between top bar 16 and rack R', as shown. The lower end of the rack R' may be gently curved as shown at 25 in FIG. 2 to merge smoothly with the rack R.

When the camper C is on the ground supported by legs presently to be described the bottom of the camper which carries the rack R is at a lower level than the truck bed 3 but the forward portion of the bracket B rises to a level somewhat above that of the truck bed so that by proper relative positioning of the truck and camper the sprocket S may be brought into mesh with the upper portion of the inclined rack R' of the bracket B. This may be accomplished by backing up the truck to the camper with the longitudinal center lines of the truck and camper approximately in line. With the truck and camper thus related the crank 7 is turned rotating the shaft 6 and the sprocket S carried thereby.

Figure 4:
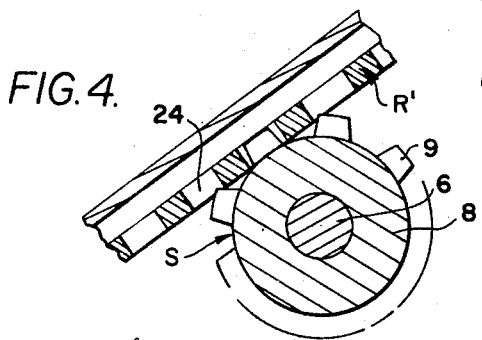
FIG. 4 is an enlarged fragmentary central vertical longitudinal cross-sectional view taken on the line IV—IV of FIG. 3.

Turning of the sprocket S draws the forward end of the camper forwardly and upwardly relatively to the truck. The camper may be mounted on wheels or rollers so that when the sprocket is turned the camper will be drawn toward the truck while the truck remains stationary or the camper may be disposed in fixed position and the truck brake released resulting in backing of the truck toward the camper when the sprocket is turned. In either case turning of the sprocket advances the inclined rack R' upwardly and toward the right viewing FIG. 4. But since the inclined rack R' is in effect an integral part of the camper this causes the camper to tilt toward the broken line position of FIG. 1 and to start to climb up onto the truck bed. Continuing rotation of the sprocket S draws the camper upwardly and forwardly. When the sprocket reaches the lower portion of the inclined rack R' it passes to the rack R on the bottom of the body of the camper and the loading movement continues uninterruptedly. The only means needed to load the camper onto the truck are the sprocket and aligned inclined and horizontal racks and means to rotate the sprocket.

By reason of the fact that the racks are located on the center line of the camper it is not essential that the truck and camper be exactly aligned when starting the loading movement, especially if the camper is mounted on wheels or rollers. If any non-alignment of the center lines of the truck and camper exists that non-alignment will automatically be resolved into alignment by turning of the camper relatively to the truck as the loading progresses.

Engagement of the imperforate portions of rack R' with shoulders 8 of sprocket S, during lifting, increases the lateral stability of the camper and also reduces the force required to lift the camper, since rack R' will move on shoulders 8 at the same rate as it is moved by the sprocket teeth 9. Also, such engagement limits the penetration of the sprocket teeth into perforations 24, thus avoiding jamming or wedging of the teeth in the rack. Engagement of shoulders 8 with portions 12 of rack R increases the lateral stability of the camper, reduces friction and avoids jamming or wedging of the sprocket teeth, as above, while the rolling action of shoulders 8 beneath rack R facilitates lateral movement of the camper into longitudinal alignment with the truck bed. Similarly, on unloading, engagement of racks R and R' with sprocket shoulders 8 increases lateral stability of the camper, reduces friction and prevents jamming or wedging of the sprocket teeth in the respective rack.

As the camper approaches fully loaded position on the truck bed the forward end of the bracket B approaches the back of the cab of the truck. By that time the inclined rack R' has fully served its purpose since the sprocket will then be in mesh with the rack R. Consequently the bracket B is no longer needed for loading. The latching pin 18 may be retracted and the bracket swung from operative to inoperative position, i.e., from the solid line position to the broken line position of FIG. 3, or if preferred the pin 17 may be withdrawn upwardly from the hinge knuckles of the plate 15 and the bracket B and the bracket may be bodily removed. In either case provision is made for the front end of the camper body to lie against or in immediate proximity to the back of the truck cab when the camper is fully loaded as shown in solid lines in FIG. 1.

Unloading of the camper is simply the reverse of the loading operation. The crank 7 is turned in the opposite direction and the camper begins to move rearwardly off of the truck bed. If the camper legs are equipped with wheels or rollers the truck may remain stationary and the camper may tilt downwardly and be pushed on its wheels or rollers rearwardly of the truck until it is free of the truck and resting upon the ground. Alternatively, if the camper legs are not equipped with wheels or rollers the truck brake may be released and as the unloading operation progresses the truck may move forward. During the unloading operation the sprocket S is in mesh first with the rack R and finally with the inclined rack R', passing smoothly and uninterruptedly from one rack to the other. During both the loading operation and the unloading operation the camper will automatically tilt between inclined and horizontal position when it becomes overbalanced in movement in either direction but this does not impair the operation of the sprocket which remains in mesh with the rack R.

Figures 6, 7, 8:
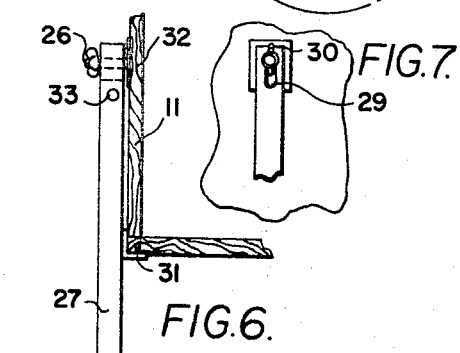
FIG. 6 is a fragmentary diagrammatic view partly in elevation and partly in transverse cross section showing a portion of the camper and one of the legs for supporting the camper when it is resting on the ground.
FIG. 7 is a fragmentary diagrammatic side elevational view of a portion of the structure shown in FIG. 6 as viewed from the left-hand side of FIG. 6.
FIG. 8 is a fragmentary diagrammatic side elevational view of the structure shown in FIGS. 6 and 7 with the leg in inoperative position fastened to the side of the camper.
Figures 9, 10, 11:
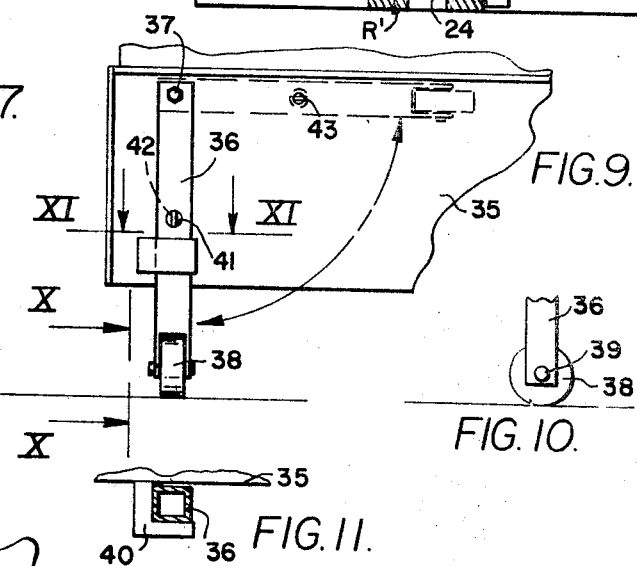
FIG. 9 is a fragmentary diagrammatic transverse elevational view of a portion of the rear of the camper showing another form of supporting leg in solid lines in operative position and in broken lines in inoperative postion.
FIG. 10 is a fragmentary side elevational view taken on the line X—X of FIG. 9.
FIG. 11 is a fragmentary horizontal cross-sectional view taken on the line XI—XI of FIG. 9.

FIGS. 7, 8 and 9 show a form of camper supporting leg. Four such legs may be used, one at each side of the camper near the front of the camper and one at each side of the camper near the rear of the camper. In FIG. 9 the side of the camper body 11 is shown as having a stud 26 mounted thereon and projecting laterally horizontally therefrom. The leg 27 has at its bottom a foot 28 and adjacent its upper end a vertically elongated slot 29 through which the stud 26 passes, a wing nut 30 being applied to the stud to prevent disconnection of the leg from the stud. The leg 27 has a projection 31 which when the leg is in operative position underlies the camper body so that the downward thrust of the camper body is transmitted through the bottom of the camper body and the projection 31 to the leg 27 minimizing or completely eliminating stress on the generally vertical side portion of the camper body. The vertical support is entirely at the projection 31 and not at the stud 26 which is disposed in the vertically elongated slot 29 of the leg.

A bore 33 is formed through the leg 27 near the upper end thereof. When the leg 27 is not in use the wing nut 30 is removed and the leg withdrawn so that the stud 26 is no longer in the elongated slot 29 and the leg is turned through 90° and reapplied to the side of the camper with the stud 26 passing through the bore 33. The leg is turned to horizontal position with the projection 31 lying alongside the camper body and the leg being supported on a lug 34 carried by the outside of the camper body. The wing nut 30 is reapplied and the leg is carried in inoperative position by the side of the camper body as shown in FIG. 8.

Another form of supporting leg is shown in FIGS. 9, 10 and 11. This form of leg is especially adapted to be applied to the rear of the camper which is provided with a bumper 35. The supporting leg 36 is pivotally mounted on the bumper 35 at 37 and is adapted to be turned about the axis of the pivotal mounting 37 between a vertical operative position shown in solid lines in FIG. 9 and a horizontal inoperative position shown in broken lines in that figure. The leg 36 carries a roller 38 at its bottom which is rotatable about an axle 39. When the leg 36 is in operative position it lies within an L-shaped support 40 carried by the bumper as shown in FIG. 11.

Suitable means are provided for maintaining the leg 36 in operative and inoperative positions. A spring-biased latching pin 41 similar to that shown in FIG. 5 may be mounted on the leg and adapted to be projected into bores 42 and 43 of the bumper to maintain the leg 36 in operative and inoperative positions respectively.

The leg 36 is movable in a plane transverse of the camper between operative and inoperative positions. Two such legs may be employed, both mounted on the bumper at the rear of the camper but one adjacent one side of the camper and the other adjacent the other side of the camper.

Two legs of the form of FIGS. 6–8 may be employed near the front of the camper with two legs of the form of FIGS. 9–11 at the rear of the camper. There is no need in any event of having wheels or rollers on the legs near the front of the camper because as soon as the loading movement starts those legs are raised from contact with the ground. If legs of the form shown in FIGS. 6–8 are used at the sides of the camper near the rear of the camper they may be provided with rollers like the rollers 38. Alternatively all rollers on the supporting legs for the camper may be eliminated in which case relative movement between the truck and camper during loading and unloading occurs through movement of the truck while the camper remains stationary.

While I have shown and described certain present preferred embodiments of the invention it is to be distinctly understood that the invention is not limited thereto but may be otherwise variously embodied within the scope of the following claims.

I claim:

1. In a device for loading and unloading an object onto and off a generally horizontal bed of a vehicle, said object having an undersurface and supporting means positioning said undersurface normally at a level below that of said bed, with the front of said object facing and adjacent to the rear edge of said bed, the improvement comprising:

a sprocket having teeth and a shoulder at each side of said teeth;

means for rotatably mounting said sprocket at a central position at the rear edge of said bed;

a rack inclined upwardly from the undersurface of said object and mounted centrally of the front of said object to extend therefrom during at least loading and unloading, said rack having a central longitudinal series of openings spaced apart a distance corresponding to said sprocket teeth and a substantially imperforate portion on each side of said openings, which portions engage said shoulders of said sprocket with said openings in sequential engagement with said ratchet teeth; and means for rotating said sprocket to pull the front end of said object upwardly onto the rear edge of said bed and to lower the front end of said object from the rear edge of said bed to said position with said undersurface below the level of said bed.

2. In a device as set forth in claim 1, including: a second rack mounted on the underside of said object and having a longitudinal series of openings spaced apart a distance corresponding to said sprocket teeth, said second rack being mounted centrally of said object and in alignment with said first rack when in said extended position, whereby engagement of said second rack with said sprocket moves said object onto and off said bed, respectively after and before engagement with said first rack.

3. In a device as set forth in claim 2, including:

a bracket mounted on said object at the center of the front thereof and having an inclined member forming said rack; and means pivoting said bracket to said object, whereby said bracket may be swung to a position against the front of said object after said object is moved onto said bed with said bracket beyond said sprocket.

4. In a device as set forth in claim 2, including:

a bracket mounted on said object at the center of the front thereof and having an inclined member forming said rack; and means removably attaching said bracket to said object, whereby said bracket may be removed after said object is moved onto said bed with said bracket beyond said sprocket.

5. In a device as set forth in claim 2, including:

a supporting leg adjustably mounted on each side of said object near the front thereof, each said leg being adjustable between an upright position for supporting said object and a storage position along the corresponding side of said object; and each said leg having a projection engaging the underside of said object in said upright position.

6. In a device as set forth in claim 5, wherein:

a stud projects generally horizontally from each side of said object at a position corresponding to the upper end of the corresponding leg in said upright position;

each said supporting leg is provided with a transverse slot receiving said stud in said upright position of said leg; and means on said stud for clamping said leg.

7. In a device as set forth in claim 6, wherein: each said leg is provided with a transverse hole at right angles to said slot and receiving said stud in said storage position.

8. In a device as set forth in claim 2, including:

a leg connected to said object near the rear end thereof and adjacent each side thereof, each said leg being adjustable between a position depending from said object and a storage position;

each said leg being provided with a roller disposed at the lower end of said leg when in said depending position; and means for maintaining said leg in said depending and said storage positions.

9. In a device as set forth in claim 2, wherein:

said vehicle comprises a pickup truck;

said object comprises a camper having a rear bumper;

a supporting leg is pivoted to the bumper and swingable about its pivotal connection with the bumper, transversely of said camper, between an operative position extending downwardly from said pivotal connection and a storage position extending generally horizontally from said pivotal connection; and means for maintaining said leg in each of said positions.

10. In a device as set forth in claim 9, including:

a latching pin carried by said leg; and said bumper having two openings for receiving said latching pin with said leg in its operative and storage positions, respectively.

References Cited

UNITED STATES PATENTS

| | | | |
|---|---|---|---|
| 2,305,762 | 12/1942 | Cristofoletti et al. | 214—85.1 |
| 3,148,795 | 9/1964 | Leach | 214—515 |
| 3,197,054 | 7/1965 | Settem | 214—517 |
| 3,221,913 | 12/1965 | Chamberlain | 214—517 |
| 3,229,839 | 1/1966 | Rasmussen | 214—517 |
| 3,409,154 | 11/1968 | Rasmussen | 214—515 |

ALBERT J. MAKAY, Primary Examiner

U.S. Cl. X.R.

254—45